United States Patent
Ikeda

[11] Patent Number: 6,031,513
[45] Date of Patent: Feb. 29, 2000

[54] LIQUID CRYSTAL DISPLAY

[75] Inventor: Naoyasu Ikeda, Tokyo, Japan

[73] Assignee: NEC Corporation, Tokyo, Japan

[21] Appl. No.: 09/019,162

[22] Filed: Feb. 6, 1998

[30] Foreign Application Priority Data

Feb. 6, 1997 [JP] Japan ................................ 9-023834

[51] Int. Cl.[7] .................................................. G09G 3/36
[52] U.S. Cl. ............................ 345/92; 345/103; 345/87
[58] Field of Search ................................ 345/87, 88, 89, 345/98, 99, 100, 103, 92, 93, 147, 149; 349/54, 74

[56] References Cited

U.S. PATENT DOCUMENTS

| | | | |
|---|---|---|---|
| 4,602,292 | 7/1986 | Togashi et al. | 345/103 |
| 4,842,371 | 6/1989 | Yasuda et al. | 345/103 |

FOREIGN PATENT DOCUMENTS

| | | |
|---|---|---|
| 5-19722 | 1/1993 | Japan . |
| 5-249925 | 9/1993 | Japan . |
| 6-202138 | 7/1994 | Japan . |
| 8-179731 | 7/1996 | Japan . |
| 8-305325 | 11/1996 | Japan . |

*Primary Examiner*—Xiao Wu
*Attorney, Agent, or Firm*—Sughrue, Mion, Zinn, Macpeak & Seas, PLLC

[57] ABSTRACT

A liquid crystal display comprises a matrix of parallel gate bus lines and parallel data bus lines disposed on the substrate, a plurality of thin-film transistors disposed on a substrate near regions where the data bus lines and the gate bus lines cross at the right angles to each other, and a plurality of columns of pixel electrodes disposed on the substrate and connected respectively to the thin-film transistors. The data bus lines are grouped into a plurality of sets of at least two data bus lines for supplying signals to the columns of pixel electrodes along the data bus lines. The data bus lines in each of the sets have respective lengths different from each other. Each of the pixel electrodes in each of the columns is connected to one of the data bus lines in each of the sets through one of the thin-film transistors.

8 Claims, 7 Drawing Sheets

LIQUID CRYSTAL DISPLAY

BACKGROUND OF THE INVENTION

1. Field of the Invention

The present invention relates to a liquid crystal display, and more particularly to the art of reducing the power consumption of a liquid crystal display.

2. Description of the Related Art

One conventional active matrix liquid crystal display in which active elements are connected to respective pixels for energizing a liquid crystal is known from "ELECTRONIC DISPLAY" edited by Shouichi Matsumoto, p. 66–67, published by Ohm-sha. A liquid crystal display described in this literature is illustrated in FIG. 1 of the accompanying drawings.

Figure 1:
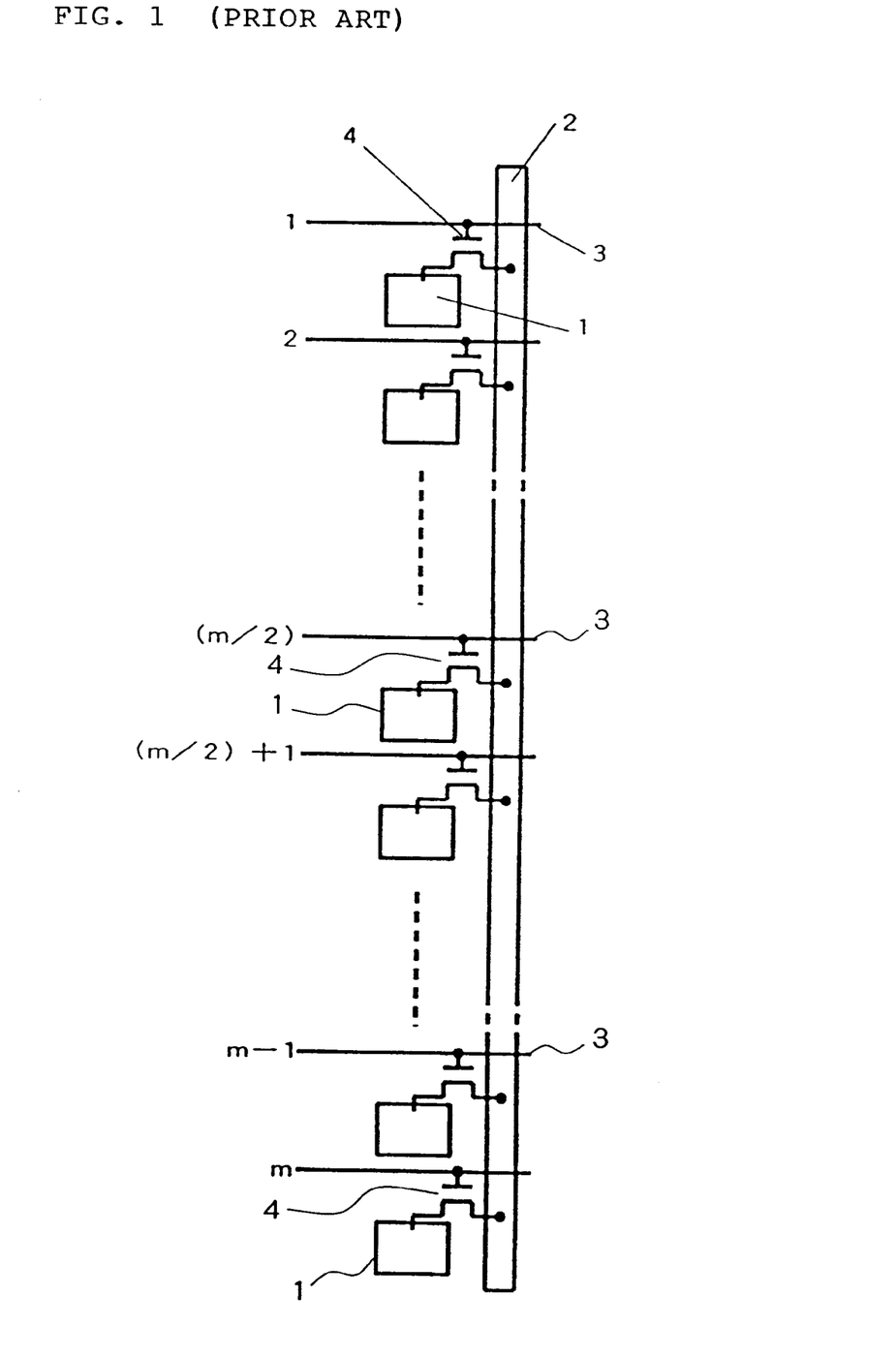
FIG. 1 is a circuit diagram of a conventional liquid crystal display.

The liquid crystal display shown in FIG. 1 comprises a matrix of data bus lines 2 and gate bus lines 3 (1–m) which cross at right angles to each other, and a plurality of thin-film transistors (TFTs) 4 disposed near regions where the data bus lines 2 and the gate bus lines 3 cross each other, for controlling currents flowing from the data bus lines 2 to pixel electrodes 1 with signals supplied from the gate bus lines 3. FIG. 1 shows a section of the liquid crystal display which corresponds to one of the data bus lines 2.

Figure 2A:
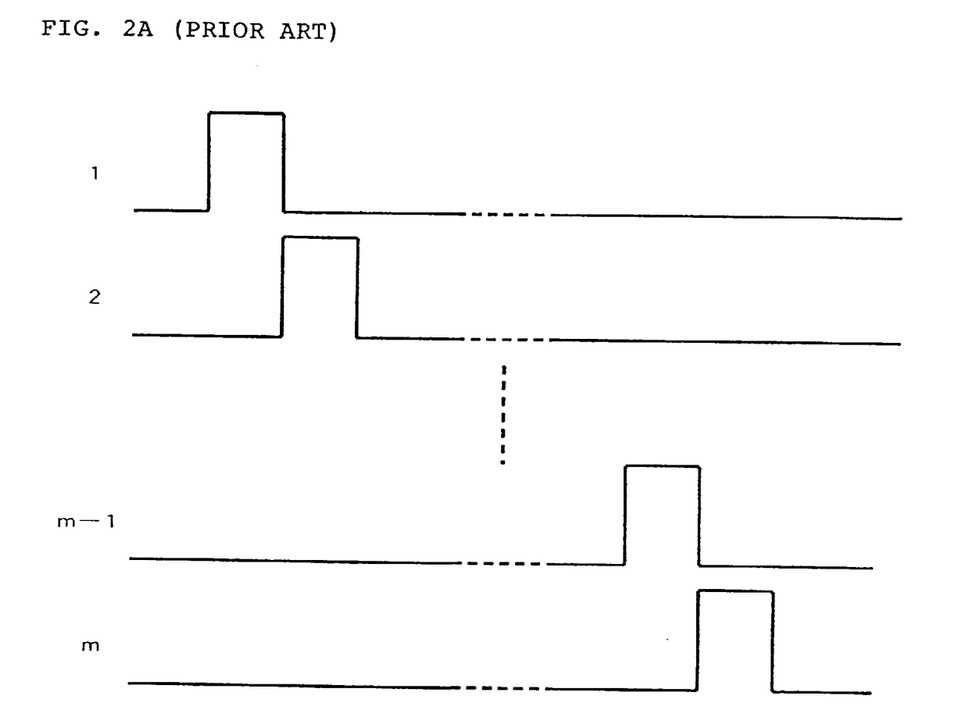
FIGS. 2A and 2B are timing charts of signals in the conventional liquid crystal display.
Figure 2B:
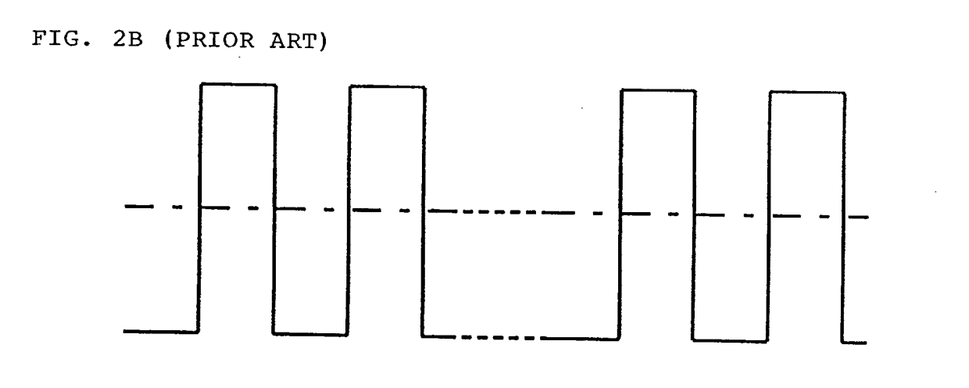

Signals, described below, are supplied to the liquid crystal display to energize same. FIGS. 2A and 2B are timing charts of such signals. When the gate bus lines 3 are successively selected and turned on at given periods, as shown in FIG. 2A, a TFT 4 connected to the selected gate bus line 3 is turned on, writing a signal from the data bus line 2, which is being energized by an alternating-current signal with respect to a confronting electrode voltage, into the corresponding pixel electrode 1 (see FIG. 2B). This operation is repeated from the first gate bus line 3 to the mth gate bus line 3 for thereby completing the display of one frame. When one cycle of scanning up to the mth gate bus line 3 is finished, another cycle of scanning is started from the first gate bus line 3.

In the conventional liquid crystal display, since each time a gate bus line 3 is turned on a signal voltage is applied to the data bus line 2, the total quantity of electric charges supplied to and removed, for example, from one data bus line during a period of one frame when a solid black image is displayed on the entire display panel is expressed by:

$$Q_1 \times m$$

where $Q_1$ represents the amount of electric charges required for one data bus line 2 and m represents the number of gate bus lines.

Since the entire quantity of electric charges for the entire display panel is calculated by multiplying the above total quantity of electric charges by the number of data bus lines, the calculated entire quantity of electric charges is large enough to increase the power consumption of the liquid crystal display. Because the above charges are proportional to the area of the data bus lines, the power consumption increases as the size of the data bus lines increases even if the number of pixels used remains the same. Consequently, even if the number of pixels used remains the same, as the display panel size increases, the electric power required to energize the liquid crystal capacity increases though the electric energy consumed by a signal processing system does not increase.

Therefore, if the conventional liquid crystal display is incorporated in a battery-powered unit such as a personal digital assistant, the period of time for which the battery-powered unit can be used without being recharged is reduced.

SUMMARY OF THE INVENTION

It is an object of the present invention to provide a liquid crystal display which reduces the electric charges flowing into or out of a liquid crystal capacity for thereby reducing the power consumption of the liquid crystal display.

According to the present invention, a liquid crystal display comprises a matrix of parallel gate bus lines and parallel data bus lines disposed on a substrate, a plurality of thin-film transistors disposed on the substrate near regions where the data bus lines and the gate bus lines cross at right angles to each other, and a plurality of columns of pixel electrodes disposed on the substrate and connected respectively to the thin-film transistors. The data bus lines are grouped into a plurality of sets of at least two data bus lines for supplying signals to the columns of pixel electrodes along the data bus lines. The data bus lines in each of the sets have respective lengths different from each other and each of the pixel electrodes in each of the columns is connected to one of the data bus lines in each of the sets through one of the thin-film transistors.

During a period of time when pixel electrodes are selected for connection a shorter one of the data bus lines in the period of one frame, since the area of the data bus line is smaller, the quantity of electric charges flowing into and out of the data bus line is less than in the conventional liquid crystal display. If each of the sets has two data bus lines and one of the data bus lines has a length which is half the length of the other data bus line, then since the area of the shorter data bus line is half the area of the longer data bus line, the total quantity of electric charges flowing into and out of the shorter data bus line is half the total quantity in the conventional liquid crystal display during the period of time in which a signal is being supplied to the shorter data bus line.

Since the power consumption of the liquid crystal display in this period is less than the power consumption of the conventional liquid crystal display, the total power consumption of the liquid crystal display is reduced. If the liquid crystal display according to the present invention is incorporated in a personal digital assistants, then the period of time for which the personal digital assistants can be used is prolonged.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 3:
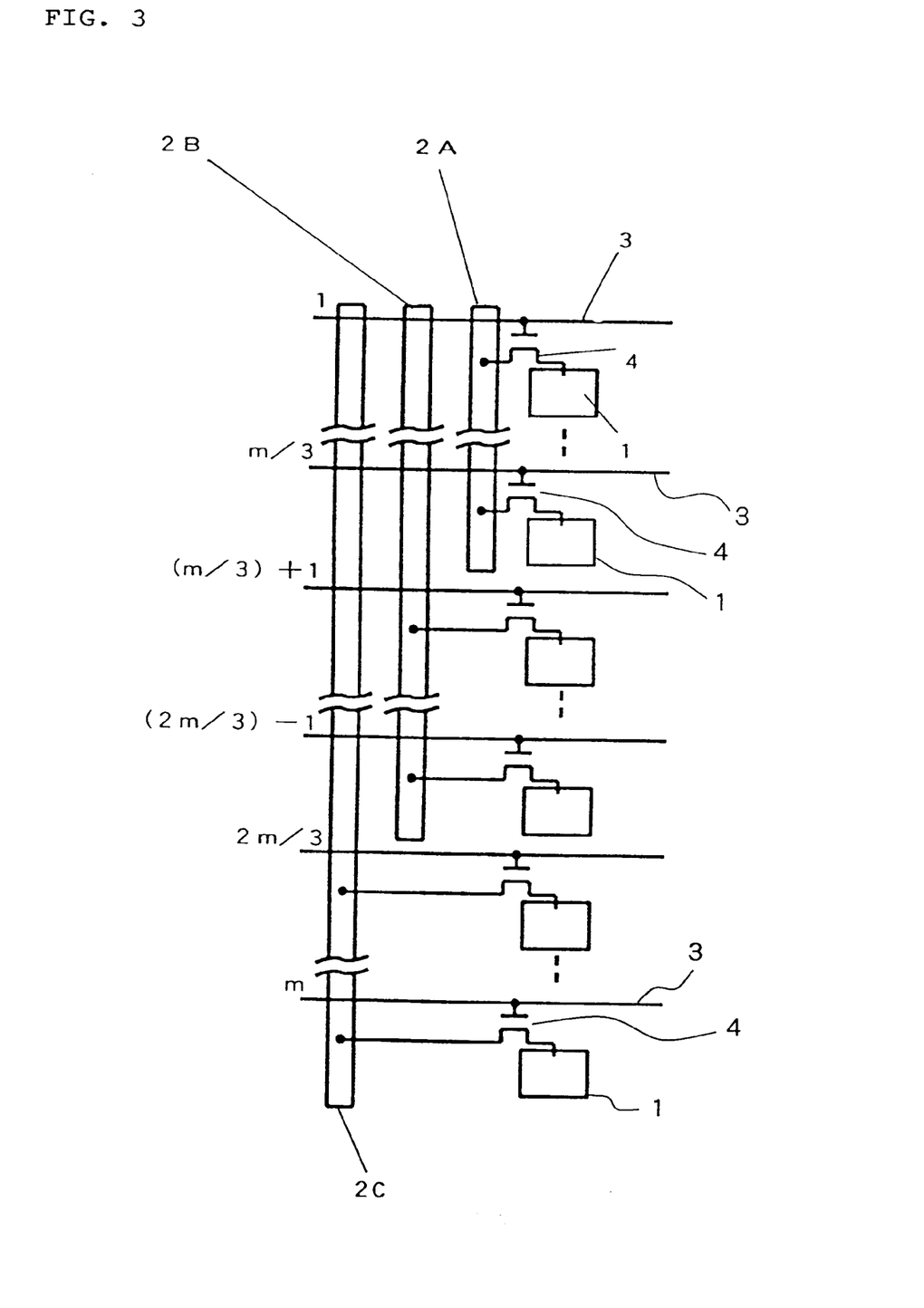
FIG. 3 is a circuit diagram of a liquid crystal display according to a first embodiment of the present invention.

As shown in FIG. 3, a liquid crystal display according to a first embodiment of the present invention has a matrix of pixel electrodes 1 providing a vertical column of m dots and a horizontal row of n dots on a substrate. The liquid crystal display also has vertical data bus lines 2A, 2B, 2C and horizontal gate bus lines 3 (l–m), and a plurality of TFTs 4 disposed as switching elements near regions where the data bus lines 2A, 2B, 2C and the gate bus lines 3 cross each other. FIG. 3 shows a section of the liquid crystal display which includes a column of TFTs 4 and a column of pixel electrodes 1 along the data bus lines. The TFTs 4 have respective gate electrodes connected to the gate bus lines 3, respective source electrodes connected to the data bus lines 2A, 2B, 2C, and respective drain electrodes connected to the pixel electrodes 1. When the gate bus lines 3 are selected, signals from the data bus lines 2A, 2B, 2C are supplied to the pixel electrodes 1. In FIG. 3, the pixel electrodes 1 and the data bus lines 2A, 2B, 2C are shown as blank blocks represented by solid lines.

Operation of the liquid crystal display according to the first embodiment will be described with reference to FIG. 3. During a period of time in which the first through (m/3)th gate bus lines 3 are selected, a signal is supplied to the data bus line 2A whose length is ⅓ of the length of the data bus line 2C for applying a voltage to the corresponding pixel electrodes 1. During a period of time in which (m/3) gate bus lines, i.e., the {(m/3)+1}th through {(m/3)×2}th gate bus lines 3, are selected, a signal is supplied to the data bus lines 2B whose length is ⅔ of the length of the data bus line 2C for applying a voltage to the corresponding pixel electrodes 1. During a period of time in which (m/3) gate bus lines, i.e., the {(2m/3)+1}th through mth gate bus lines 3, are selected, a signal is supplied to the data bus line 2C for applying a voltage to the corresponding pixel electrodes 1.

When signals are applied to the pixel electrodes over the display panel, the sum of electric charges supplied to one vertical column during the period of one frame is expressed by:

$$(Q/3) \times (m/3) + \{(\tfrac{2}{3}) \times Q\} \times (m/3) + Q \times (m/3) = (\tfrac{2}{3}) \times m \times Q$$

where Q represents electric charges supplied to the data bus line 2C while one gate bus line is being selected. Since the electric charges m×Q are consumed when the pixel electrodes are charged and discharged according to the ordinary process, the liquid crystal display according to the first embodiment has an equivalent displaying capability simply by consuming electric charges which are ⅔ of the electric charges m×Q.

In the first embodiment, three data bus lines are employed. However, the liquid crystal display according to the first embodiment may have two or more data bus lines which are different in length from each other. While the gate bus lines are selected successively downwardly in the above process of operation, they may be selected in any of various other sequences. The lengths of the data bus lines 2A, 2B, 2C have a ratio of 1:2:3 in the illustrated embodiment. However, one of the data bus lines may be of the longest length, and the other data bus lines may be shorter than the longest data bus line.

Figure 4:
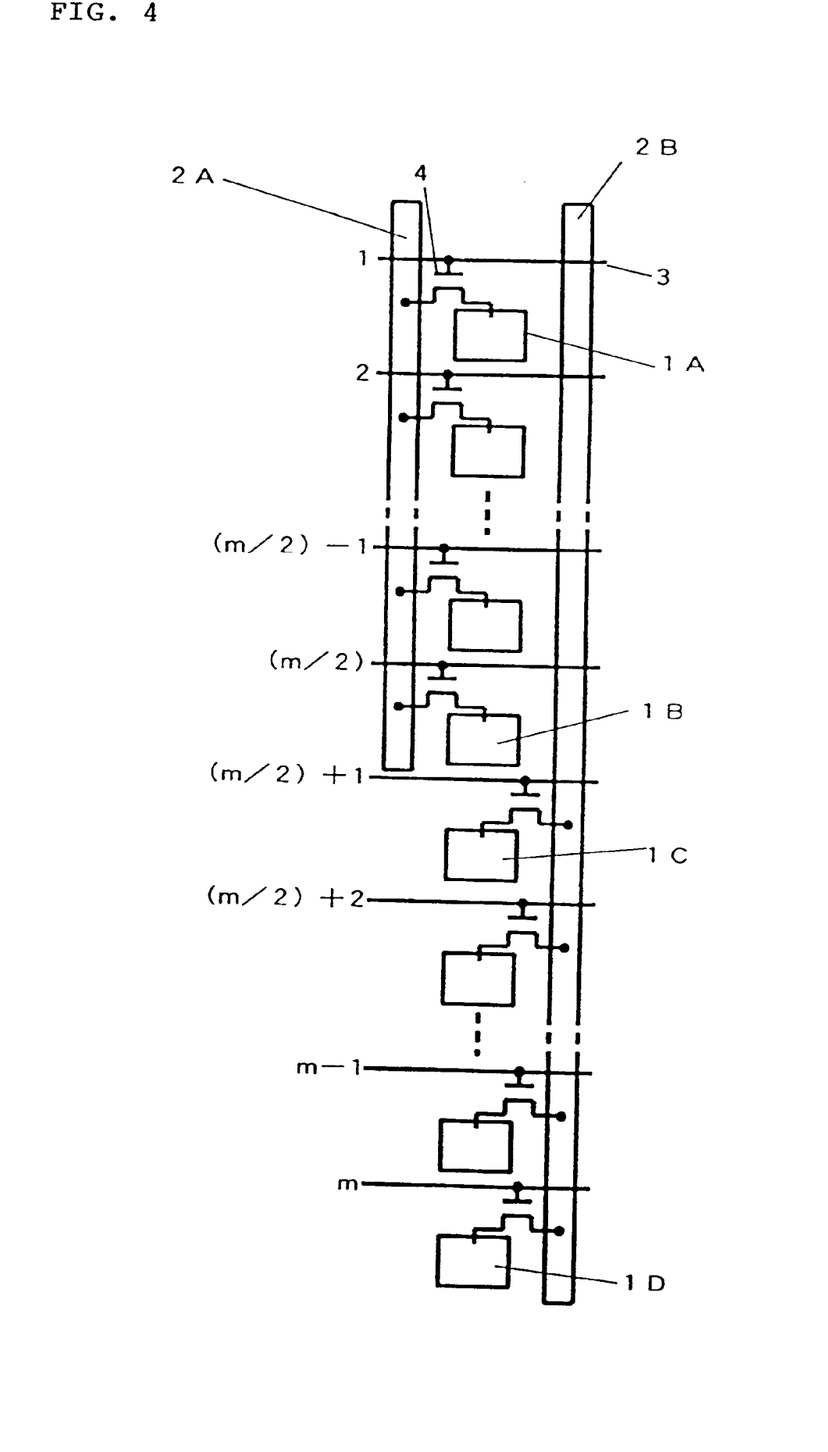
FIG. 4 is a circuit diagram of a liquid crystal display according to a second embodiment of the present invention.

FIG. 4 shows a liquid crystal display according to a second embodiment of the present invention.

As shown in FIG. 4, the liquid crystal display according to the second embodiment has a matrix of pixel electrodes 1 providing a vertical column of m dots and a horizontal row of n dots on a substrate. The liquid crystal display also has vertical data bus lines 2A, 2B and horizontal gate bus lines 3 (l–m), and a plurality TFTs 4 disposed as switching elements near regions where the data bus lines 2A, 2B and the gate bus lines 3 cross each other. FIG. 4 shows a section of the liquid crystal display which includes a column of TFTs 4 and a column of pixel electrodes 1 along the data bus lines. The TFTs 4 have respective gate electrodes connected to the gate bus lines 3, respective source electrodes connected to the data bus lines 2A, 2B, and respective drain electrodes connected to the pixel electrodes 1. When the gate bus lines 3 are selected, signals from the data bus lines 2A, 2B are supplied to the pixel electrodes 1. In FIG. 4, the pixel electrodes 1 and the data bus lines 2A, 2B are shown as blank blocks represented by solid lines.

Operation of the liquid crystal display according to the second embodiment will be described with reference to FIG. 4. During a period of time in which the first through (m/2)th gate bus liens 3 are selected, a signal is supplied to the data bus line 2A whose length is ½ of the length of the data bus line 2B for applying a voltage to the corresponding pixel electrodes 1. During a period of time in which (m/2) gate bus lines, i.e., the {(m/2)+1}th through mth gate bus lines 3, are selected, a signal is supplied to the data bus line 2B for applying a voltage to the corresponding pixel electrodes 1.

When signals are supplied to the pixel electrodes over the display panel, the sum of electric charges supplied to one vertical column during the period of one frame is expressed by:

$$(Q/2) \times (m/2) + Q \times (m/2) = (\tfrac{3}{4}) \times m \times Q$$

where Q represents electric charges supplied to the data bus line 2B while one gate bus line is being selected. Since the electric charges m×Q are consumed when the pixel electrodes are charged and discharged according to the ordinary process, the liquid crystal display according to the second embodiment has an equivalent displaying capability simply by consuming electric charges which are ¾ of the electric charges m×Q.

In the second embodiment, two data bus lines are employed because if the number of data bus lines is increased, the display area per pixel is reduced because the area of the increased data bus lines is not capable of displaying images in transmissive liquid crystal displays. With the two data bus lines, it is possible to achieve the object of the present invention while preventing the display area per pixel from being reduced.

Figure 5A:
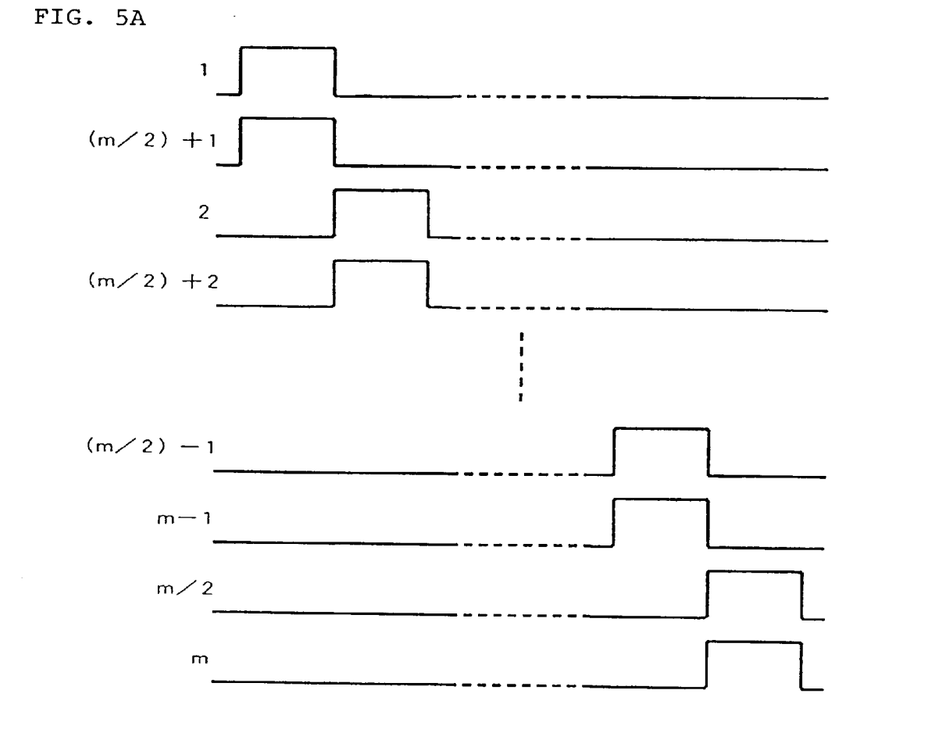
FIGS. 5A and 5B are timing charts of signals in a liquid crystal display according to a third embodiment of the present invention.
Figure 5B:
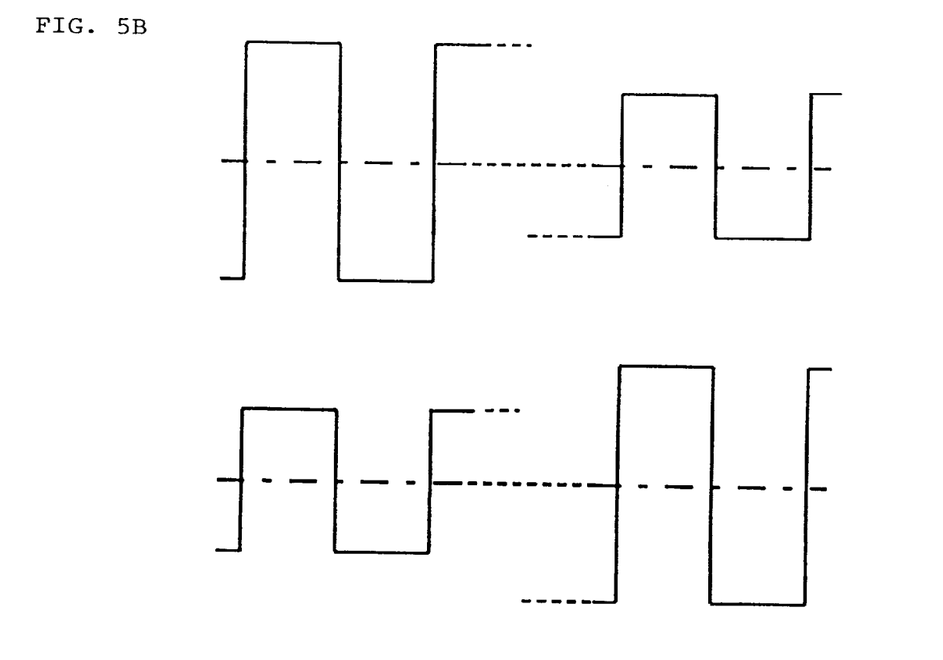

A liquid crystal display according to a third embodiment will be described with reference to FIGS. 5A and 5B. The liquid crystal display according to the third embodiment has two data bus lines, and is identical to the liquid crystal display shown in FIG. 4. FIGS. 5A and 5B are timing charts of signals in the liquid crystal display according to the third embodiment of the present invention.

The liquid crystal display according to the third embodiment operates as follows: As shown in FIG. 5A, the first and {(m/2)+1}th gate bus lines are first selected at the same time. At this time, a signal voltage is applied from the data bus lines 2A, 2B to the pixel electrodes 1A, 1C, energizing a liquid crystal with a predetermined voltage (see FIG. 5B). The above cycle of operation is repeated until the gate bus lines are successively scanned up to the (m/2)th and mth gate bus lines to apply the voltage up to the pixel electrodes 1B, 1D for thereby displaying one frame.

According to the third embodiment, the period of time required to display one frame may be reduced to one half by applying the voltage simultaneously to two pixel electrodes, so that the power consumption of a signal processing circuit (not shown) can be lowered. Furthermore, the period of time required to apply the voltage may be doubled to provide room for designing the device. For example, the size of the thin-film transistors may be reduced to one half.

When signals are supplied to the pixel electrodes over the display panel, the sum of electric charges supplied to one vertical column during the period of one frame is expressed by:

$$(Q/2) \times (m/2) + Q \times (m/2) = (3/4) \times m \times Q$$

where Q represents electric charges supplied to the data bus line 2B while one gate bus line is being selected. Since the electric charges m×Q are consumed when the pixel electrodes are charged and discharged according to the ordinary process, the liquid crystal display according to the third embodiment has an equivalent displaying capability simply by consuming electric charges which are ¾ of the electric charges m×Q.

In the third embodiment, two data bus lines are employed. However, the liquid crystal display according to the third embodiment may have more than two data bus lines which are different in length from each other. While the gate bus lines are selected successively downwardly in the above process of operation, they may be selected in any of various other sequences. The lengths of the data bus lines 2A, 2B have a ratio of 1:2 in the third embodiment. However, one of the data bus lines may be of the longest length, and the other data bus line may be shorter than the longest data bus lines.

Figure 6:
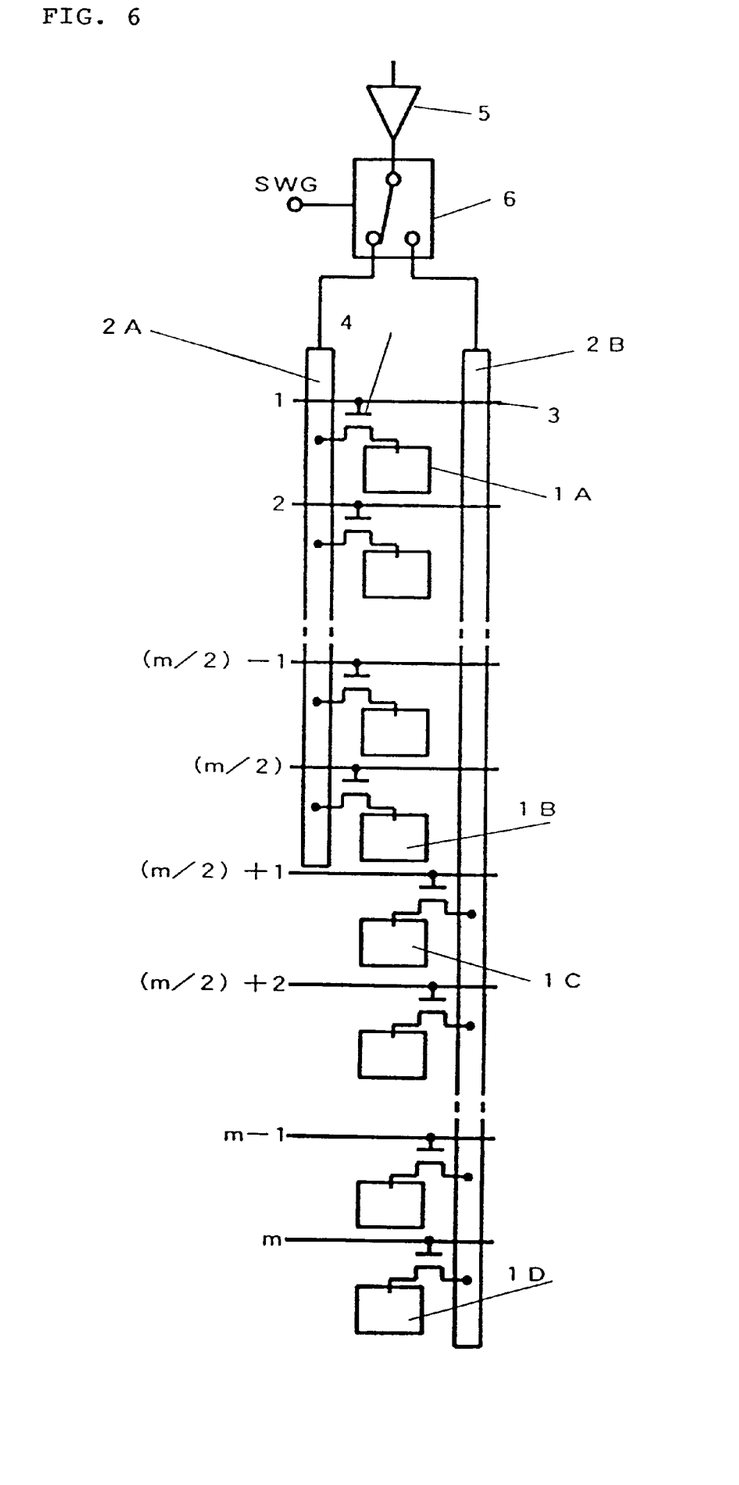
FIG. 6 is a circuit diagram of a liquid crystal display according to a fourth embodiment of the present invention.

FIG. 6 shows a liquid crystal display according to a fourth embodiment of the present invention.

As shown in FIG. 6, the liquid crystal display according to the fourth embodiment has a matrix of pixel electrodes 1 providing a vertical column of m dots and a horizontal row of n dots on a substrate. The liquid crystal display also has vertical data bus lines 2A, 2B and horizontal gate bus lines 3 (1–m), and a plurality of TFTs 4 disposed as switching elements near regions where the data bus lines 2A, 2B and the gate bus lines 3 cross each other. FIG. 6 shows a section of the liquid crystal display which includes a column of TFTs 4 and a column of pixel electrodes 1 along the data bus lines. The TFTs 4 have respective gate electrodes connected to the gate bus lines 3, respective source electrodes connected to the data bus lines 2A, 2B, and respective drain electrodes connected to the pixel electrodes 1. When the gate bus lines 3 are selected, signals from the data bus lines 2A, 2B are supplied to the pixel electrodes 1. In FIG. 6, the pixel electrodes 1 and the data bus lines 2A, 2B are shown as blank blocks represented by solid lines. A data driver IC output stage 5 is provided for each set of the data bus lines 2A, 2B. A switch 6 has an input terminal connected to the data driver IC output stage 5 and a pair of output terminals connected respectively to the data bus lines 2A, 2B. An output signal from the data driver IC output stage 5 is supplied selectively to the data bus lines 2A, 2B by the switch 6 which is operated by the level of a signal SWG.

Operation of the liquid crystal display according to the fourth embodiment will be described below with reference to FIG. 6. During a period of time in which the first through (m/2)th gate bus lines 3 are selected, the switch 6 is operated to connect the data driver IC output stage 5 to the data bus line 2A. In this period, an image signal is supplied only to the data bus line 2A. During a period of time in which (m/2) gate bus lines, i.e., the {(m/2)+1}th through mth gate bus lines 3, are selected, the switch 6 is operated to connect the data driver IC output stage 5 to the data bus line 2B. In this period, an image signal is supplied only to the data bus line 2B.

When signals are supplied to the pixel electrodes over the display panel, the sum of electric charges supplied to one vertical column during the period of one frame is expressed by:

$$(Q/2) \times (m/2) + Q \times (m/2) = (3/4) \times m \times Q$$

where Q represents electric charges supplied to the data bus line 2B while one gate bus line is being selected. Since the electric charges m×Q are consumed when the pixel electrodes are charged and discharged according to the ordinary process, the liquid crystal display according to the fourth embodiment has an equivalent displaying capability simply by consuming electric charges which are ¾ of the electric charges m×Q.

Figure 7A:
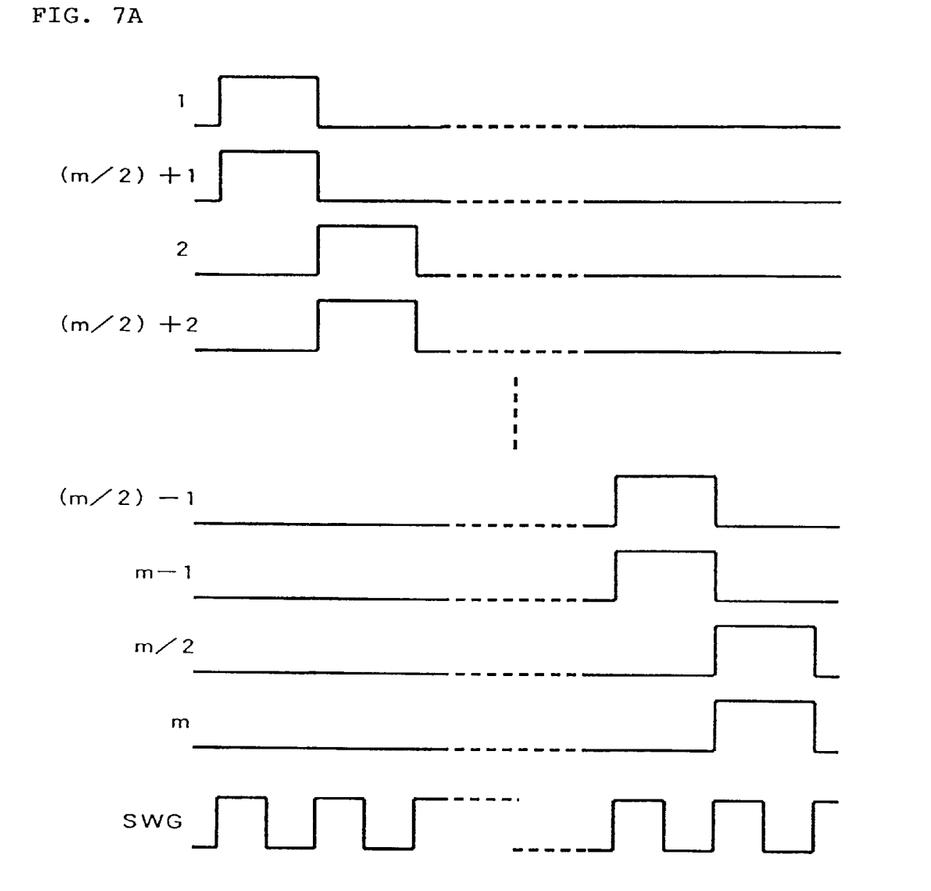
FIGS. 7A and 7B are timing charts of signals in a liquid crystal display according to a fifth embodiment of the present invention.
Figure 7B:
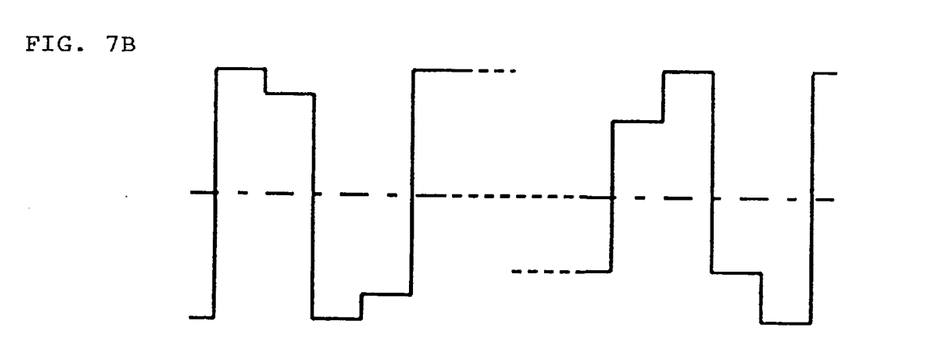

A liquid crystal display according to a fifth embodiment will be described with reference to FIGS. 7A and 7B. The liquid crystal display according to the fifth embodiment is identical to the liquid crystal display shown in FIG. 6. FIGS. 7A and 7B are timing charts of signals in the liquid crystal display according to the fifth embodiment of the present invention.

The liquid crystal display according to the fifth embodiment operates as follows: As shown in FIG. 7A, the first and {(m/2)+1}th gate bus lines are first selected at the same time. The period of time in which the gate bus lines are selected has to be twice the period of time in the ordinary line sequential scanning process. At this time, the switch 6 is operated to connect the data driver IC output stage 5 to the data bus line 2A in a period of time which is half the period in the gate bus lines are selected, for thereby applying a given voltage to the data bus line 2A. In the remaining half period of time, the switch 6 is operated to connect the data driver IC output stage 5 to the data bus line 2B. The switch 6 is operated by the signal SWG. Since the first gate bus line has continuously been turned on, the voltage is being applied from the data bus line 2A to the pixel electrode 1A. Since the capacitive component of the data bus line 2A is sufficiently large as compared with the capacitive component of the pixel electrode 1A, the given voltage can be applied to the pixel electrode 1A even when the data bus line 2A is disconnected from the data driver IC output stage 5. The voltage applied to the data bus line 2B is applied to the pixel electrode 1C, and when the two gate bus lines are not selected for scanning a next gate bus line, the desired voltage is applied to the pixel electrodes 1A, 1C (see FIG. 7A). The above cycle of operations is repeated until the gate bus lines are successively scanned up to the (m/2)th and mth gate bus lines to apply the voltage up to the pixel electrodes 1B, 1D for thereby displaying one frame.

When signals are applied to the pixel electrodes over the display panel, the sum of electric charges supplied to one vertical column during the period of one frame is expressed by:

$$(Q/2) \times (m/2) + Q \times (m/2) = (3/4) \times m \times Q$$

where Q represents electric charges supplied to the data bus line 2B while one gate bus line is being selected. Since the electric charges m×Q are consumed when the pixel electrodes are charged and discharged according to the ordinary process, the liquid crystal display according to the fourth embodiment has an equivalent displaying capability simply by consuming electric charges which are ¾ of the electric charges m×Q.

In the fifth embodiment, two data bus lines are employed. However, the liquid crystal display according to the fifth embodiment may have more than two data bus lines which are different in length from each other. While the gate bus lines are selected successively downwardly in the above process of operation, they may be selected in any of various other sequences. The lengths of the data bus lines 2A, 2B have a ratio of 1:2 in the fifth embodiment. However, one of the data bus lines may be of the longest length, and the other data bus line may be shorter than the longest data bus line.

While preferred embodiments of the present invention have been described using specific terms, such description is for illustrative purposes only, and it is to be understood that changes and variations may be made without departing from the spirit or scope of the following claims.

What is claimed is:

1. A liquid crystal display comprising:

a substrate;

a matrix of parallel gate bus lines and parallel data bus lines disposed on said substrate;

a plurality of thin-film transistors disposed on said substrate near regions where said data bus lines and said gate bus lines cross each other; and a plurality of columns of pixel electrodes disposed on said substrate and connected respectively to said thin-film transistors;

said data bus lines being grouped into a plurality of sets of at least two data bus lines for supplying signals to the columns of pixel electrodes along said data bus lines, said data bus lines in each of said sets having respective lengths different from each other, each of said pixel electrodes in each of said columns being connected to one of said data bus lines in each of said sets through one of said thin-film transistors.

2. A liquid crystal display according to claim 1, wherein said data bus lines are grouped into a plurality of sets of two data bus lines.

3. A liquid crystal display according to claim 1, wherein the gate bus lines connected to gate terminals of said thin film transistors connected to different data bus lines in each of said sets are turned on in an overlapping period of time.

4. A liquid crystal display according to claim 3, wherein said data bus lines are grouped into a plurality of sets of two data bus lines.

5. A liquid crystal display according to claim 1, further comprising a data driver IC output stage and a switch having an input terminal connected to said data driver IC output stage and a plurality of output terminals connected to different data bus lines in each of said sets, for supplying a signal from said data driver IC output stage selectively to said different data bus lines in each of said sets.

6. A liquid crystal display according to claim 5, wherein said data bus lines are grouped into a plurality of sets of two data bus lines.

7. A liquid crystal display according to claim 1, further comprising a data driver IC output stage and a switch having an input terminal connected to said data driver IC output stage and a plurality of output terminals connected to different data bus lines in each of said sets, for supplying a signal from said data driver IC output stage selectively to said different data bus lines in each of said sets, and the gate bus lines connected to gate terminals of said thin-film transistors connected to different data bus lines in each of said sets are turned on in an overlapping period of time.

8. A liquid crystal display according to claim 7, wherein said data bus lines are grouped into a plurality of sets of two data bus lines.

* * * * *